US005427506A

United States Patent [19]

Fry et al.

[11] Patent Number: 5,427,506
[45] Date of Patent: Jun. 27, 1995

[54] COMPRESSOR PRESSURE RELIEF ASSEMBLY

[75] Inventors: Emanuel D. Fry; Tara C. Kandpal, both of Tecumseh, Mich.

[73] Assignee: Tecumseh Products Company, Tecumseh, Mich.

[21] Appl. No.: 113,978

[22] Filed: Aug. 30, 1993

[51] Int. Cl.⁶ .............................................. F04B 49/00
[52] U.S. Cl. ..................................... 417/307; 417/312; 417/440; 417/902; 137/512.1; 137/543.15; 137/529
[58] Field of Search ............... 417/286, 307, 312, 440, 417/540, 902; 137/512.1, 543.15, 529

[56] References Cited

U.S. PATENT DOCUMENTS

| | | | |
|---|---|---|---|
| 2,452,612 | 11/1948 | Swenberg | 277/61 |
| 3,125,285 | 3/1964 | Larsson | 230/230 |
| 3,646,957 | 3/1972 | Allen | 137/525 |
| 4,408,967 | 10/1983 | Unger et al. | 417/571 |
| 4,472,112 | 9/1984 | Unger | 417/311 |
| 4,521,164 | 6/1985 | Tuckey | 417/540 |
| 4,522,568 | 6/1985 | Gelse et al. | 417/307 |
| 4,759,692 | 7/1988 | Morse | 417/307 |
| 4,842,492 | 6/1989 | Gannaway | 417/312 |

Primary Examiner—Richard A. Bertsch
Assistant Examiner—William Wicker
Attorney, Agent, or Firm—Baker & Daniels

[57] ABSTRACT

A compressor assembly is disclosed including a compressor mechanism mounted within a hermetically sealed housing. A cylinder block assembly, containing a plurality of reciprocating pistons within compression chambers, is covered by cylinder heads. The compression chambers include a discharge valve which permits compressed refrigerant to empty into a common discharge chamber. A pressure relief mechanism, formed by cylinder heads yieldably attached to the crankcase, is included within the compressor to eliminate damage caused by high pressure conditions such as slugging. Alternatively, pressure relief may be created in the common discharge chamber by a yieldably attached cage bearing or a valved port.

13 Claims, 4 Drawing Sheets

COMPRESSOR PRESSURE RELIEF ASSEMBLY

BACKGROUND OF THE INVENTION

The present invention relates generally to a hermetic compressor and, more particularly, to such a compressor having a pressure relief system for reducing internal pressure during a high pressure condition.

Hermetic compressors comprise a hermetically sealed housing having a compressor mechanism mounted therein. The compressor mechanism may include a crankcase or a cylinder block defining a plurality of compression chambers in which gaseous refrigerant is compressed and subsequently discharged into a common discharge cavity.

Normally, the refrigerant returning to the compressor is in the gaseous state. At times, system conditions allow liquid refrigerant to return to the compressor via the suction line as a liquid or liquid/gas mixture. At these times, the compressor encounters a condition wherein the refrigerant is a liquid entering the cylinder. The travel of liquid refrigerant through a compressor is called "slugging".

A slugging condition is harmful to a compressor because many compressor parts, such as discharge valves, are not designed to cope with the high pressure condition caused by compressing liquid and the pressure entered by the liquid refrigerant as it moves through the restrictions of the system. A system that could prevent or reduce the affect that the liquid slugging has on the compressor components such as the discharge valve would lengthen compressor life.

Additionally, slugging causes a pressure backup from the discharge muffler and applies a very high back pressure to the piston. This pressure transfers back through to the connecting rods and/or yokes of the assembly thereby causing damage.

Some prior art compressor systems include a pressure relief valve to control the pressure within the cylinder head of the compressor. It has been found that these prior art systems are often not adequate, in that they do not act quickly enough to prevent damage to the valves and other compressor parts. Suction and discharge valves require certain minimum, discrete amounts of time to open, and the impact of a liquid slug can damage the valves before they can open. Further, most valves are not large enough to handle the volume or size of the liquid moving through the system. Even if the valve is open during contact with the liquid refrigerant, the valve port may not be large enough to adequately handle the flow of refrigerant and its impact pressure.

An example of a prior art compressor that tries to satisfy pressure relief in a compressor experiencing an overpressure condition is found in U.S. Pat. No. 3,125,285. In this patent, the cylinder is topped with a valve disc, beneath the cylinder head. Normally, a coil spring biases the disc into seated engagement with the cylinder wall. During the surge of the overpressure condition, the valve disc will be elevated against the biasing force of the spring into contact with a stop ring, thereby opening a passageway between a discharge chamber and a suction pressure chamber. As stated before, the valve disk takes time to open and sometimes is not large enough to adequately handle the amount of liquid present.

An additional problem with prior art pressure relief systems, including the one above, is that of creating refrigerant leaks from high pressure areas to low pressure areas. Possible leaks are caused by high to low pressure boundaries on metal to metal seals. Refrigerant leaking between a high pressure area to a low pressure area during compressor operation causes the compressor and refrigerant system to operate less efficiently.

The present invention is directed to overcoming the aforementioned problems associated with hermetic compressors wherein it is desired to control overpressure conditions and reduce damage to the compressor while not reducing efficiency.

SUMMARY OF THE INVENTION

The present invention overcomes the aforementioned problems associated with prior art compressors by providing a mechanism to reduce the pressure within the compression chamber of the compressor by bypassing the muffler system during an overpressure condition. The invention is particularly advantageous in high side compressors where the discharge gas from the motor compressor unit is discharged into the housing.

Generally, the invention provides an overpressure relief mechanism for use with a high side hermetic compressor that permits liquid refrigerant in the cylinder bore, with any accompanying overpressure, to vent into the high pressure environment within the hermetic housing.

In one form of the invention, the overpressure condition is eliminated by allowing the cylinder head to move away from the cylinder block. In this case, the cylinder head is yieldably attached to the cylinder block over a cylinder bore, by connecting bolts including, spring means, such as bellville washers, or an enclosed pressure cylinder that yieldably bias the cylinder head against the cylinder block. Under an overpressure condition within the cylinder bore, the cylinder head will move away from the cylinder block on its connecting bolts permitting the refrigerant slug to escape through the gap between the block and cylinder head into the housing. This relief mechanism bypasses the muffler system permitting the high pressure refrigerant to be vented quickly and directly into the compressor housing.

In another form of the invention, the pressure relief assembly includes a cage bearing that is yieldably connected to the cylinder block by bolts having bellville washers. On an overpressure condition within the common discharge chamber located between the cylinder block and cage bearing, the cage bearing will separate from the cylinder block permitting the high pressure refrigerant to escape directly into the hermetic housing. Additionally, the cage bearing may include a pressure relief valve permitting the high pressure refrigerant to vent directly into the discharge pressure housing without cage bearing movement.

An advantage of the pressure relief assembly of the present invention is that it is capable of handling a refrigerant slug of large volume. Movement of the cylinder head or cage bear away from the cylinder block creates a large opening having a long perimeter thereby permitting large volumes of fluid to escape. This assures that pressure damage to the valves and other compressor components, caused by a refrigerant slug, will be minimized no matter what volume of liquid is moving through the compressor.

Another advantage of the compressor of the present invention is that the pressure relief assembly permits quick overpressure control because of the relatively large size of the opening thereby preventing damage to compressor components, particularly the discharge valves.

Yet another advantage is that by venting the high pressure slug into the high pressure housing, no high to low pressure boundaries are created across metal to metal part joints. This eliminates the potential for efficiency decreasing pressure leaks. The pressure relief assembly of the present invention bypasses the muffler system permitting discharge to go straight from a discharge pressure area of the motor compressor unit into the high pressure compressor housing. A low leak potential is created in high side hermetic compressors since there are substantially balanced pressures on both sides of the metal joint between the biased parts containing the discharge from the cylinder.

A further advantage of the preferred embodiment of the pressure relief assembly of the present invention is that no separate valve structure is created. The present invention permits use of currently designed cylinder heads on currently designed cylinder blocks therefore reducing tooling costs associated with the construction of the invention.

Yet another advantage of the pressure relief assembly of the preferred embodiment of the invention is that by using a yieldable tie down means such as bellville washers about bolts, almost instantaneous relief of an overpressure condition is possible. Further, the invention permits dual function out of a single part. The cylinder head not only functions as the head but also functions as a relief valve to permit the entire quantity of the refrigerant slug, if any, to be vented into the housing.

The invention, in one form thereof, provides a hermetic compressor having a motor compressor unit disposed within a housing. The motor compressor unit includes a cylinder block assembly defining a cylinder bore having a number of pistons reciprocable therein. A cylinder head is yieldably attached to the cylinder block assembly over the cylinder bores so that the cylinder head will separate from the cylinder block assembly during a high pressure condition within the cylinder bore. This will open the cylinder bore to the housing and relief the high pressure condition. The cylinder head is attached to the cylinder block assembly by a plurality of biasing fasteners. The biasing fasteners include an interfit bellville washer that biases the cylinder head towards the cylinder block. Alternatively, the biasing fasteners; may comprise a sealed pressure cylinder.

In another form of the invention, a motor compressor unit is disposed within a hermetically sealed housing in which the compressor unit includes a cylinder block assembly defining a plurality of cylinder bores. Each bore includes a piston reciprocable therein, and an associated discharge valve. A common discharge chamber is located within the housing into which the discharge valves empty. The muffler chamber is sealed by a yieldable cover, whereby the cover moves away from the muffler chamber during a high pressure condition within the chamber. The cover comprises a cage bearing plate attached to the cylinder block by biasing fasteners.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
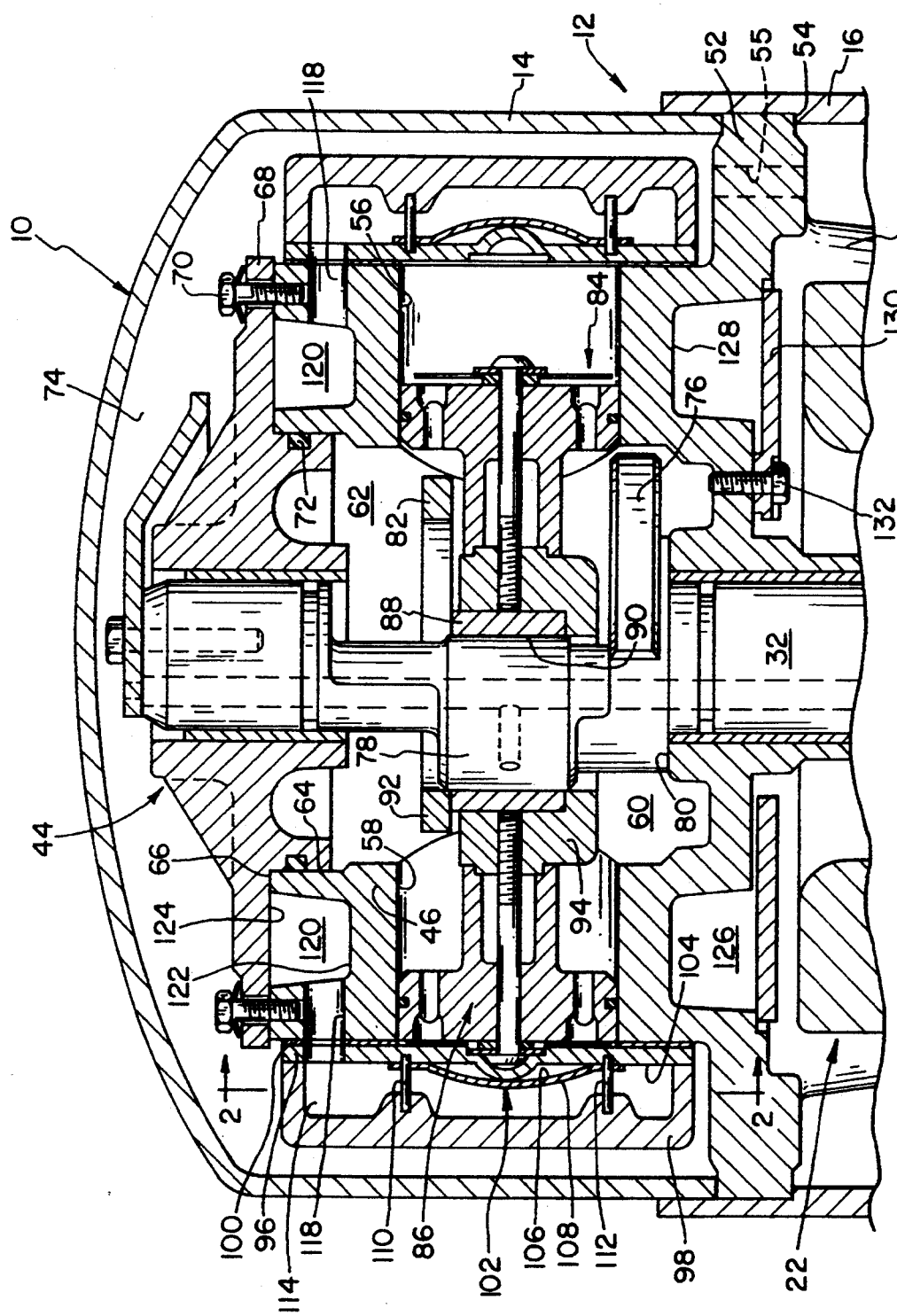
FIG. 1 is a fragmentary sectional view of a compressor incorporating the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

In an embodiment of the invention as shown in the drawings, and in particular by referring to FIG. 1, a partial compressor assembly 10 is shown having a housing generally designated at 12. The housing has a top portion 14, a central portion 16, and a bottom portion 18 (not shown). The three housing portions are hermetically secured together as by welding or brazing.

Located within hermetically sealed housing 12 is an electric motor generally designated at 22. Motor 22 has a central aperture (not shown) into which is secured a crankshaft 32 by an interference fit. A terminal cluster (not shown) is provided in housing 12 for connecting the compressor to a source of electric power.

Also enclosed within housing 12, in the embodiment shown in FIG. 1, is a scotch yoke compressor mechanism generally designated at 44. A description of a basic scotch yoke compressor design is given in U.S. Pat. No. 4,838,769 assigned to the assignee of the present invention and expressly incorporated by reference herein.

Compressor mechanism 44 comprises a cast metal crankcase or cylinder block 46 including a circumferential mounting flange 52 axially supported within an annular ledge 54 in central housing portion 16. The lower portion of crankcase 46 and mounting flange 52 serve to divide the interior of the housing 12 into an upper chamber in which the compressor mechanism 44 is mounted, and a lower chamber in which motor 22 is disposed. A passage 55 extends through flange 52 to provide communication between the top and bottom ends of housing 12 for return of lubricating oil and equalization of discharge pressure within the entire housing interior.

Compressor mechanism 44, as illustrated, takes the form of a reciprocating piston, scotch yoke compressor. More specifically, crankcase 46 includes four radially disposed cylinders bores or compression chambers, two of which are shown in FIG. 1 and designated as cylinder bore 56 and cylinder bore 58. Crankcase 46 may be constructed by conventional casting techniques. The four radially disposed cylinder bores open into and communicate with a central suction cavity 60 defined by inside cylindrical wall 62 in crankcase 46. A relatively large pilot hole 64 is provided in a top surface 66 of crankcase 46. Various compressor components, including crankshaft 32, are assembled through pilot hole 64. A top cover such as cast metal cage bearing 68 is mounted onto the top surface of crankcase 46 by means of a plurality of bolts 70 extending through bearing 68 into top surface 66. When cage bearing 68 is assembled to crankcase 46, and O-ring seal 72 normally isolates suction cavity 60 from a discharge pressure space 74 defined by the interior of housing 12. This mounting arrangement of cage bearing 68 will be more thoroughly discussed below.

Crankshaft 32 is rotatably journalled in crankcase 46, and extends through suction cavity 60. Crankshaft 32 includes a counterweight portion 76 and an eccentric portion 78 located opposite one another with respect to the central axis of rotation of crankshaft 32 to thereby counterbalance one another. The weight of crankshaft 32 and rotor 26 is supported on thrust surface 80 of crankcase 46.

Eccentric portion 78 is operably coupled by means of a scotch yoke mechanism 82 to a plurality of reciprocating piston assemblies corresponding to, and operably disposed within, the four radially disposed cylinders in crankcase 46. As illustrated in FIG. 1, piston assemblies 84 and 86, representative of four radially disposed piston assemblies operable in compressor assembly 10, are associated with cylinder bores 56 and 58, respectively.

Scotch yoke mechanism 82 comprises a slide block 88 including a cylindrical bore 90 in which eccentric portion 78 is journalled. Scotch yoke mechanism 82 also includes a pair of yoke members 92 and 94 which cooperate with slide block 88 to convert orbiting motion of eccentric portion 78 to reciprocating movement of the four radially disposed piston assemblies.

Compressed refrigerant within each cylinder bore 58 is discharged through discharge port 97 in valve plate 96. With reference to cylinder 58 in FIG. 1, a cast metal cylinder head 98 is mounted, as discussed below and shown in FIGS. 2–5, to crankcase 46 with valve plate 96 interposed therebetween. Cylinder head 98 includes a contact edge 99 that sealably engages valve plate 96. Valve plate gasket 100 is provided between valve plate 96 and crankcase 46.

Discharge valve assembly 102 is situated on a top surface 104 of valve plate 96 as shown in FIG. 1. Generally, compressed gas is discharged through valve plate 96, past a discharge valve 106 that is limited in its travel by discharge valve retainer 108. Guide pins 110 and 112 extend between valve plate 96 and cylinder head 98, and guidingly engage holes in discharge valve 106 and discharge valve retainer 108 at diametrically opposed locations therein. Valve retainer 108 is biased against cylinder head 98 to normally retain discharge valve 106 against top surface 104 at the diametrically opposed locations.

Figure 4:
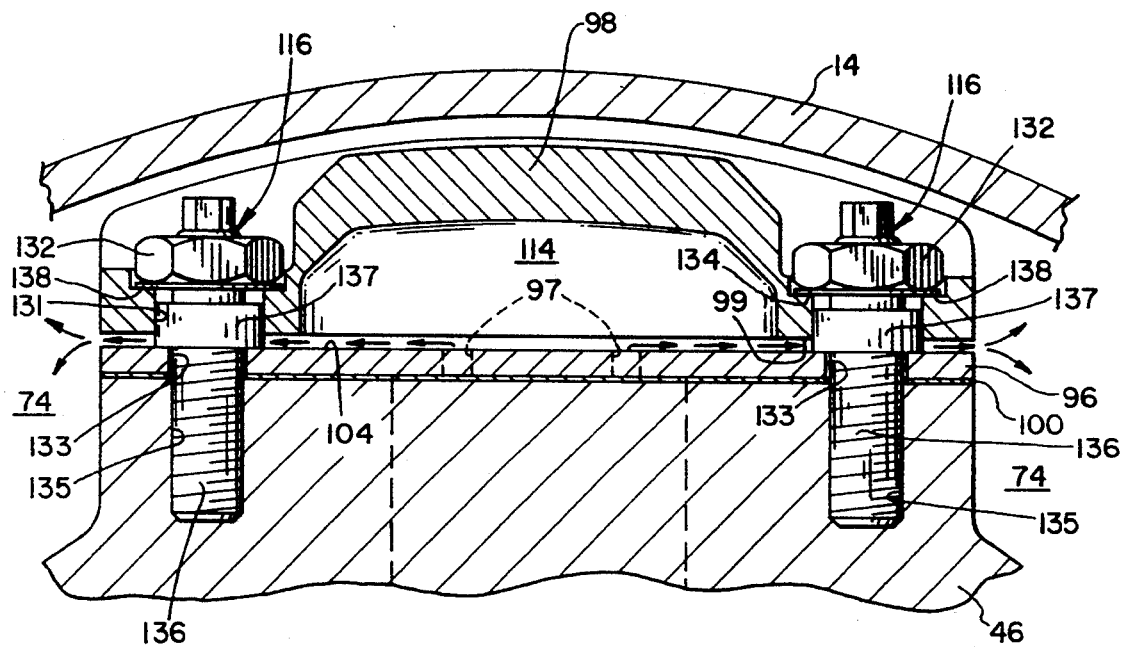
FIG. 4 is a top sectional view of the embodiment of FIG. 3 shown in its actuated state.

Referring once again to cylinder head 98, a discharge chamber 114 is defined by the space between top surface 104 above valve plate 96 and the underside of cylinder head 98. Head 98 is mounted about its perimeter to crankcase 46 by a plurality of bolts 116, as shown in FIG. 4 in accordance with one embodiment of the present invention to be discussed below. Discharge gas within discharge chamber 114, associated with each respective cylinder, passes through a respective connecting passage 118 in crankcase 46 (FIG. 1). Connecting passage 118 provides communication from discharge space 114 to a top annular muffling chamber 120.

Top muffling chamber 120, common to and in communication with all of the compression chambers 114, is defined by an annular channel 122 formed in top surface 66 of crankcase 46, and a top plate or cover portion 124 of case bearing 68. Connecting passage 118 passes not only through crankcase 46, but also through holes in valve plate 96 and valve plate gasket 100 (FIG. 1).

Top muffling chamber 120 communicates with bottom muffling chamber 126 and subsequently into housing 12 by means of exit passageways (not shown) extending through crankcase 46. Bottom muffling chamber 126 is defined by an annular channel 128 and a muffler cover plate 130 (FIG. 1). Cover plate 130 is mounted against bottom surface crankcase 46 by bolts 132 in main bearing 52. Compressed gas within bottom muffling chamber 126 exits past cover plate 130 into housing 12.

In operation, piston assembly 86 will reciprocate within cylinder bore 58. As piston assembly 86 moves from bottom dead center position to top dead center position on its compression stroke, gaseous refrigerant within cylinder bore 58 will be compressed and forced through discharge port 95 in valve plate 96, past discharge valve 106, through discharge chamber 114, connecting passage 118, and into common discharge chamber 120.

The compressed refrigerant now travels through exit passageways into lower muffling chamber 162 and then on into compressor housing 12.

Figure 2:
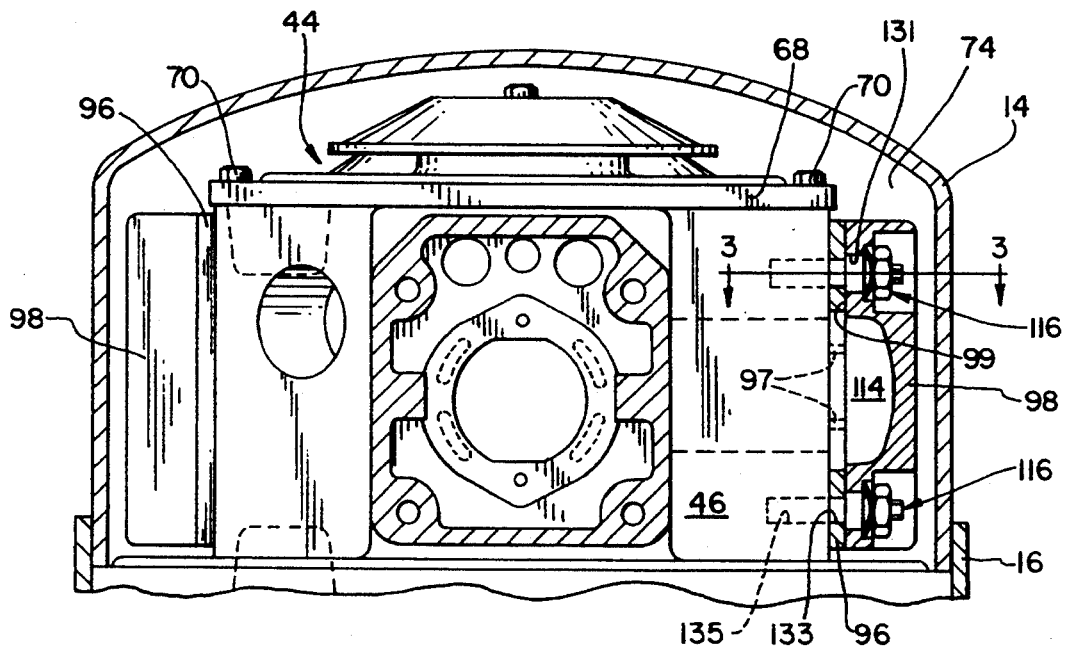
FIG. 2 is an a fragmentary sectional view of the compressor of FIG. 1.

The present invention permits an overpressure or slugging condition within compressor mechanism 44 to be relieved. In one form of the invention, as shown in FIGS. 2–4, cylinder head 98 is yieldably attached to cylinder block or crankcase 46.

Figure 3:
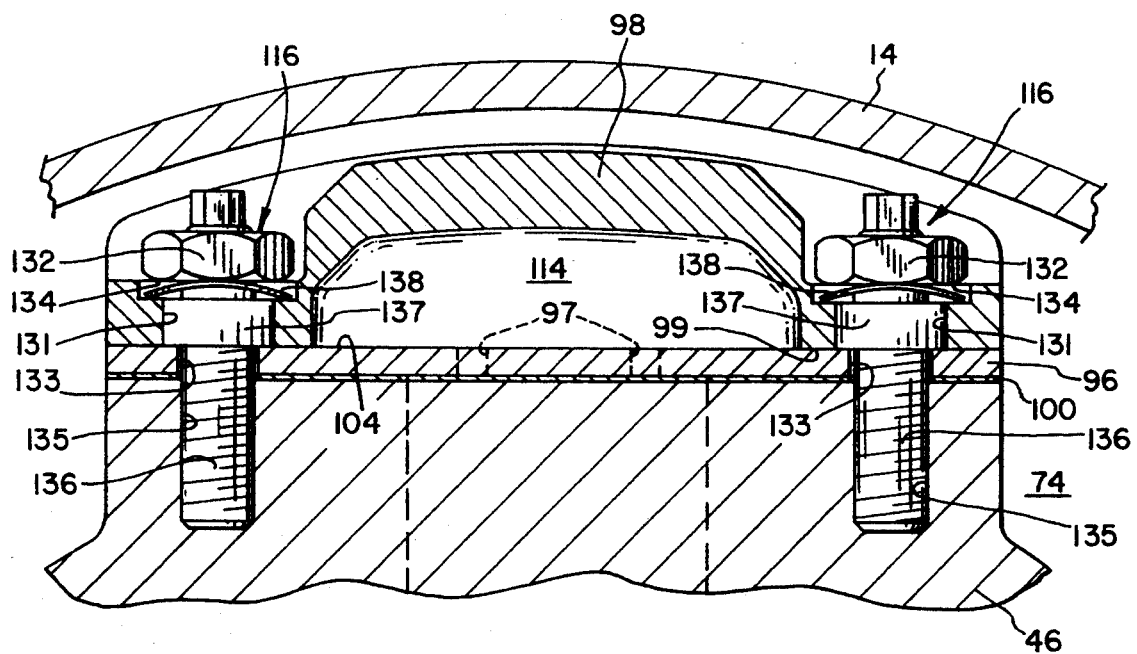
FIG. 3 is a top view of the embodiment of FIG. 2.

As shown in FIG. 3, bolts 116 attach through openings 131 in cylinder head 98. Bolts 116 pass through an opening 133 in valve plate 96 and threadably engages bores 135 in crankcase 46. Bolt 116 includes a head portion 132 attached to bolt shaft portion 136 forming a shoulder 134.

Cylinder head 98 is yieldably connected to crankcase 46 by an interfit biasing means such as a bellville washer 138 between shoulder 134 of bolt 116 and cylinder head 98. Bellville washer 138 is preferably constructed from spring steel although other materials may be used. Bolt 116 secures valve plate 96 to crankcase 46 and also serves as a guide for cylinder head 98.

Alternatively, a sealed cylinder, much like shock absorber on an automobile maybe equivelenty used on bias cylinder head 98 into yieldable connection with crakcase 46. A metallic sleeve 137 is interfit about bolt shaft 136 and is located within opening 131. Sleeve 137 prevents valve plate 96 from separating apart from crankcase 46. Cylinder head 98 is further guided during movement by sleeve 137 on bolt 116.

In operation, when a force produced by an overpressure condition within discharge chamber 114 that exceeds the clamping or bias force of bellville washer 138, cylinder head 98 will lift off from valve plate 96 because of a pressure differential. This will allow the compressed refrigerant within discharge chamber 114 to escape, thereby reducing the pressure within discharge chamber 114. The escaping high pressure will flow between the cylinder head 98 and valve plate 96 directly into the discharge pressure space 74 defined by the interior of housing 12 as shown in FIG. 4. Particularly, the gas will flow past the contacting edge 99 of cylinder head 98 in all radial directions. The movement of cylinder head 98 eliminates momentary high pressure conditions which may cause compressor damage.

After the slugging condition has been relieved, the bias force of bellville washers 138 will push cylinder head 98 back into sealing engagement with valve plate 96 and crankcase 46 as shown in FIG. 3. Contact edge 99 will then be in metal to metal contact with valve plate 96.

Figure 5:
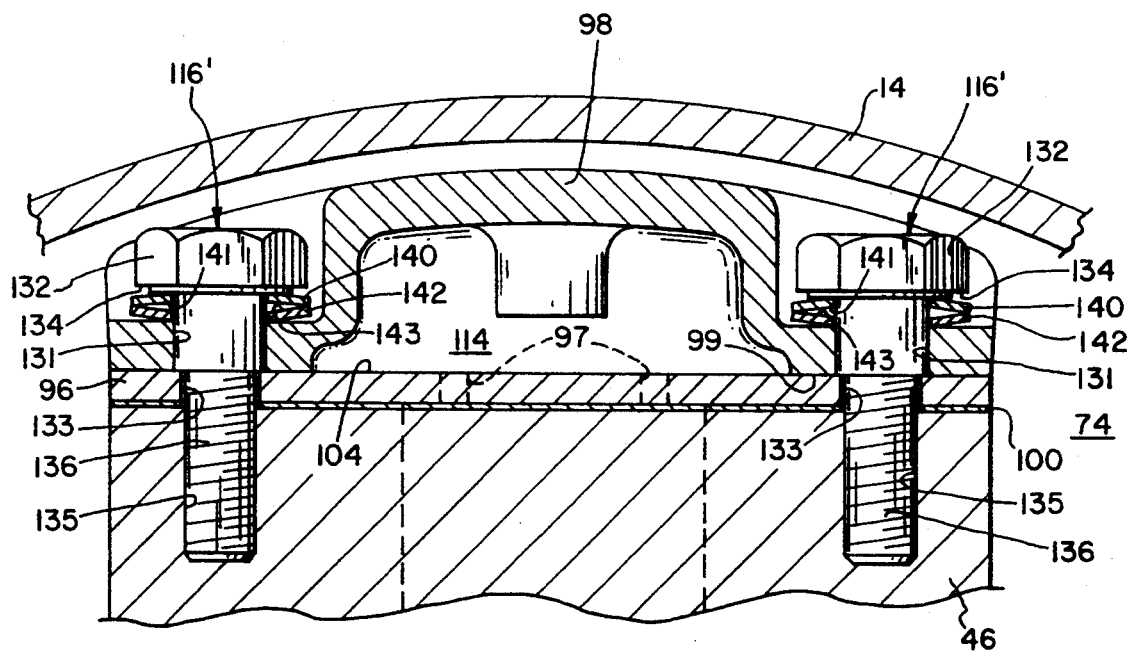
FIG. 5 is a top sectional view of an alternate embodiment of the invention.

An alternative arrangement is shown in FIG. 5 wherein a bolt 116' attaches cylinder head 98 to crankcase 46 with a different biasing means. The biasing means shown in FIG. 5 includes two bellville washers 140 and 142 disposed on bolt shaft 146. Bellville washers 140 and 142 are biased against each other between bolt head 132 and cylinder head 98. Each washer 140 and 142 includes a concave side 141 and 143 respectively arranged to face each other when interfit on bolt shaft 146.

Figure 6:
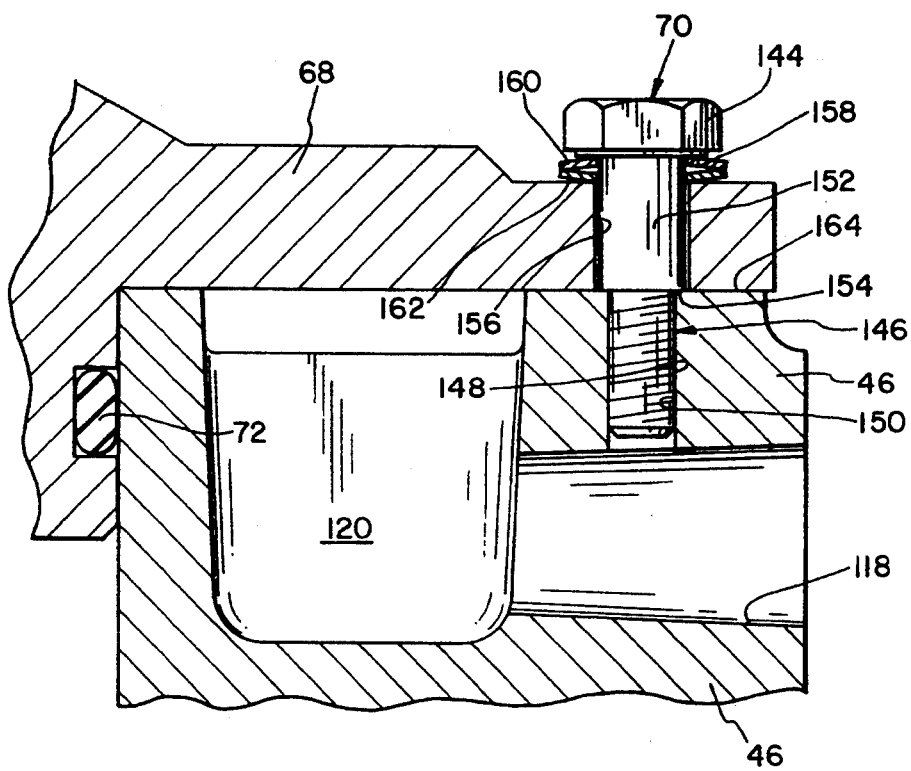
FIG. 6 is an enlarged sectional view of the compressor of FIG. 1 showing another alternate embodiment of the invention.

In a similar fashion, an overpressure condition may be alleviated in the common discharge chamber 120 as shown in the embodiment of FIG. 6. FIG. 6 shows an enlarged view of a portion of common discharge chamber 120 with cage bearing 68 yieldably attached to crankcase or cylinder block 46 by means of bolt 70. Bolt 70 includes a head portion 144 connected to a shaft portion 146 forming an edge 158. Shaft 146 includes a threaded portion 148 threadedly engaging crankcase 46 in a threaded bore 150. Bolt shaft 146 also includes a smooth portion 152 that is circumferentially larger than threaded portion 148 forming an engagement shoulder 154 that interferes with and engages crankcase 46. Smooth portion 152 of shaft 146 slidably interfits within a bore 156 in cage bearing plate 68. Between bolt head 144 and cage bearing plate 68 is a biasing means, such as a pair of bellville washers 160 and 162 arranged around shaft 146, to bias cage bearing plate 68 toward crankcase 46.

The pressure relief system utilized with top cover plate 68 operates similarly to the previously described system regarding cylinder head 98. On the occurrence of an overpressure condition within common discharge chamber 120, pressure within chamber 120 will force cage bearing plate 68 upward against bellville washers 60 and 62, biasing bellville washers upward, such that cage bearing plate 68 and crankcase 46 will separate at the metal joint 164 therebetween, thereby permitting overpressurized discharge fluid to communicate directly into the discharge pressure environment within housing 12. This movement of cage bearing plate 68 creates a long opening thereby relieving the overpressure condition within discharge chamber 120.

After the pressure has been relieved, the bias force of bellville washers 120 and 122 will force the cage bearing plate 68 back into engaging contact with crankcase 46 thereby sealing joint 164 between the two metal members.

Figure 7:
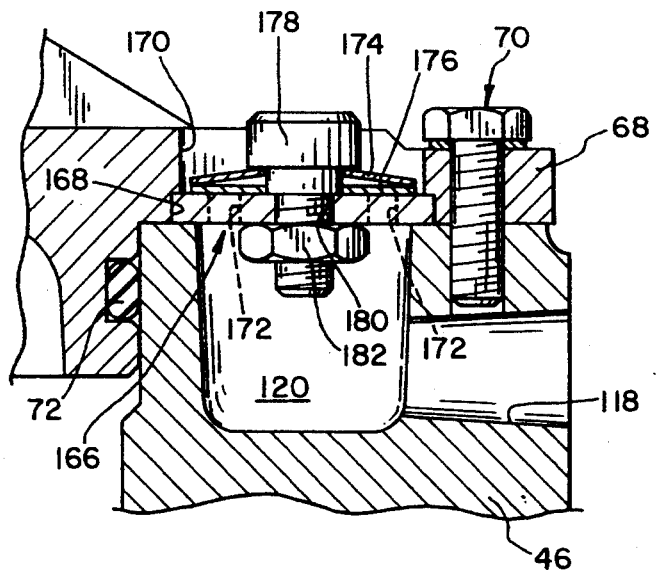
FIG. 7 is an enlarged sectional view of the compressor of FIG. 1 showing the common discharge muffler interfit with a valve.
Figure 8:
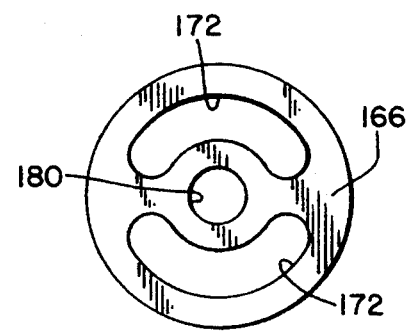
FIG. 8 is an enlarged view of the valve plate shown in FIG. 7.

An additional form of pressure relief is shown in FIGS. 7 and 8. As more clearly shown in FIG. 7, overpressure slugging control can be created by a valve plate 166 interfit in a counterbore 168 in a passageway 170 through cage bearing top cover plate 68. Valve plate 166 includes a plurality of kidney shaped ports 172 (FIG. 8) to permit discharge gases and liquid in discharge chamber 120 to exit into the interior of housing 12 (Reference number 74). Above valve plate 166, as shown in FIG. 7, is a seal means such as bellville washers 174 and 176, overfitting and thereby sealing ports 172. Bellville washers 174 and 176 are attached to valve plate 166 by a bolt 178 that is threaded through a bore 180 in valve plate 166. Bolt 178 is fixedly attached to valve plate 166 by means of a nut 182 attached from within discharge chamber 120.

On the occurrence of a slugging or overpressure condition within common discharge chamber 120, the liquid refrigerant under pressure will bias bellville washers 174 and 176 away from valve plate 166 thereby permitting the liquid refrigerant under pressure in discharge chamber 120 to pass through ports 172 and into the interior 74 of housing 12. The bias pressure of bellville washers 174 and 176 may be selected so nuisance openings of ports 172 are prevented while still allowing overpressure protection.

The size of ports 172 may vary depending on the particular compressor design and muffler size. The particular size of ports 172 is one in which liquid slugging is controlled and reduced, but the pressure drop through the muffler system is minimized.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hermetic compressor comprising:
   a hermetically sealed housing at discharge pressure;
   a motor-compressor unit disposed within said housing, said unit including a cylinder block assembly defining a cylinder bore, said unit having a piston reciprocatable within said cylinder bore; and
   a cylinder head yieldably attached to said cylinder block assembly over said cylinder bore, whereby said cylinder head may separate from said cylinder block assembly during an excessive high pressure condition within said cylinder bore, thereby opening said cylinder bore to said housing and relieving the high pressure condition.

2. The hermetic compressor of claim 1 in which said cylinder head is attached to said cylinder block assembly by a plurality of biasing fasteners.

3. The hermetic compressor of claim 2 in which each of said biasing fasteners include a bolt that is threadably attached to said cylinder block assembly.

4. The hermetic compressor of claim 2 in which each of said biasing fasteners includes a bolt with an interfit bellville washer that biases said cylinder head toward said cylinder block assembly.

5. The hermetic compressor of claim 2 in which each of said biasing fasteners includes a bolt interfit with two bellville washers, each of said washers having a concave side, said concave sides of said washers facing each other.

6. The hermetic compressor of claim 1 in which said cylinder block assembly includes a valve plate, said cylinder head separates from said valve plate during the high pressure condition.

7. The hermetic compressor of claim 6 in which said cylinder head is attached to said cylinder block assembly by a plurality of biasing fasteners, said valve plate fixedly attached to said cylinder block assembly by said biasing fasteners.

8. The hermetic compressor of claim 7 in which each of said biasing fasteners comprises a bolt with an interfit bellville washer that biases said cylinder head toward said cylinder block assembly, each of said bolts including a metal sleeve that engages said valve plate to said cylinder block assembly.

9. A hermetic compressor comprising:
a hermetically sealed housing at discharge pressure;
a motor-compressor unit disposed within said housing, said unit including a cylinder block assembly defining a plurality of cylinder bores, said unit having a plurality of pistons reciprocatable within said cylinder bores, each bore including an associated discharge valve; and
a common muffler chamber within said housing into which said discharge valves empty, said muffler chamber including a separate top cover, said top cover yieldably sealed over said muffler chamber, whereby said cover may move away from said muffler chamber during an excessive high pressure condition within said muffler chamber causing said muffler chamber to empty directly into said housing.

10. The hermetic compressor of claim 9 in which said muffler chamber is formed in said cylinder block assembly, said cover comprising a cage bearing plate attached to said cylinder block assembly by a biasing fastener.

11. The hermetic compressor of claim 10 in which said biasing fastener includes at least one bolt with an interfit bellville washer that biases said top cover toward said cylinder block assembly.

12. A hermetic compressor comprising:
a hermetically sealed housing at discharge pressure;
a motor-compressor unit disposed within said housing, said unit including a cylinder block assembly defining a plurality of cylinder bores, said unit having a plurality of pistons reciprocatable within said cylinder bores, each bore including one associated discharge valve;
a common muffler chamber within said housing into which said discharge valves empty, said muffler chamber including an exit port emptying into the interior of said housing; and
pressure relief means for relieving excessive high pressure within said muffler chamber caused by liquid refrigerant, said relief means having a valve plate attached over said muffler chamber, said valve plate having a port therethrough for passage of liquid refrigerant, said port yieldably sealed by a washer, said washer attached to said valve plate by a bolt, whereby said washer bends to open said port during a high pressure condition.

13. The hermetic compressor of claim 12 in which said valve plate port is large enough to substantially maintain a constant exit port pressure regardless of the level of the high pressure condition within said muffler chamber.

* * * * *